(12) United States Patent
Lei et al.

(10) Patent No.: US 11,028,641 B2
(45) Date of Patent: Jun. 8, 2021

(54) BUILT-IN ROLLER SHADE ACTUATION DEVICE

(71) Applicant: Leafy Windoware Co., Ltd., Dongguan (CN)

(72) Inventors: Zhenbang Lei, Guangdong (CN); Xingbang Lei, Guangdong (CN)

(73) Assignee: Leafy Windoware Co., Ltd., Dongguan (CN)

( * ) Notice: Subject to any disclaimer, the term of this patent is extended or adjusted under 35 U.S.C. 154(b) by 240 days.

(21) Appl. No.: 16/345,736

(22) PCT Filed: Jun. 16, 2017

(86) PCT No.: PCT/CN2017/088658
§ 371 (c)(1),
(2) Date: Apr. 29, 2019

(87) PCT Pub. No.: WO2018/223415
PCT Pub. Date: Dec. 13, 2018

(65) Prior Publication Data
US 2019/0257147 A1    Aug. 22, 2019

(30) Foreign Application Priority Data

Jun. 6, 2017   (CN) .......................... 201710419921.5

(51) Int. Cl.
*E06B 9/42*      (2006.01)
*E06B 9/60*      (2006.01)
(Continued)

(52) U.S. Cl.
CPC ................. *E06B 9/42* (2013.01); *E06B 9/60* (2013.01); *E06B 9/72* (2013.01); *F16H 37/041* (2013.01); *E06B 2009/725* (2013.01)

(58) Field of Classification Search
CPC ..... E06B 9/42; E06B 9/60; E06B 9/68; E06B 9/72; E06B 2009/725; F16H 37/041
See application file for complete search history.

(56) References Cited

U.S. PATENT DOCUMENTS

| 2008/0121353 | A1* | 5/2008 | Detmer | ..................... E06B 9/72 160/266 |
| 2016/0208551 | A1* | 7/2016 | Huang | ..................... E06B 9/60 |
| 2020/0332596 | A1* | 10/2020 | Sonzini | ..................... E06B 9/84 |

FOREIGN PATENT DOCUMENTS

| CN | 2323123 Y | * | 6/1999 |
| CN | 2434419 Y | * | 6/2001 |

(Continued)

*Primary Examiner* — Beth A Stephan (57) ABSTRACT

A built-in roller shade actuation device for actuating a winding drum with opposite ends rotatably mounted to corresponding frames and an outer side mounted with an end of a shade body includes an actuator assembled in the winding drum for providing a rotation power, a shaft mounted to one of the frames outside an end of the winding drum and inserted into the winding drum, and a gear pair mounted between the actuator and the shaft for realizing power transmission. A shell of the actuator and the winding drum are relatively fixed in a circumferential direction. The gear pair includes a planetary gear mounted to an output shaft of the actuator, and a fixed gear mounted to the shaft and coaxial with the winding drum. The planetary gear revolves around the fixed gear while being driven to rotate by the output shaft of the actuator.

17 Claims, 4 Drawing Sheets

(51) Int. Cl.
    *F16H 37/04*        (2006.01)
    *E06B 9/72*         (2006.01)

(56)            References Cited

FOREIGN PATENT DOCUMENTS

CN          201032699 Y   *   3/2008
CN          102485518 A   *   6/2012
CN          202380963 U   *   8/2012
CN          205977059 U   *   2/2017
DE           19725961 A1  *  12/1998

* cited by examiner

BUILT-IN ROLLER SHADE ACTUATION DEVICE

BACKGROUND OF THE INVENTION

1. Field of the Invention

The present invention relates to window shade technical field and, more particularly, to a built-in roller shade actuation device.

2. Description of Related Art

Roller shades are a type of curtain products that roll shade bodies on winding drums to form rollers and use cords or chains to do up-and-down controls, which are easy to operate, and among which, there is a roller shade which is called a spring roller shade due to a built-in spring device of a winding drum, also known as a semi-automatic roller shade.

Opposite ends of a winding drum of a current spring roller shade are mounted to corresponding brackets, and a spring end, a coil spring, a damper, and a limiter are arranged in order from an end to an opposite end in the winding drum. When the shade body needs to be put down, the shade body only needs to be pulled down, and the shade body will drive the winding drum to rotate and then rotate relative to the coil spring. The coil spring is twisted and deformed to accumulate elastic force. At the same time, by means of the damper, the shade body can be held at any height position within the effective range of the shade body. When the shade body needs to be rolled up, the shade body only needs to be pushed up, and the force of the coil spring overcomes the damping action of the damper to drive the winding drum to rotate in an opposite direction, thereby rewinding the shade body on the winding drum. The coil spring of the current spring roller shade is directly connected to the winding drum, and although the structure is relatively simple, it is prone to unevenness. Furthermore, the coil spring is used, and the whole coil spring is deformed during the action, which makes the generated elastic force difficult to be controlled effectively. When the elastic force is too large, it is easy to make the shade body rise rapidly, causing a lower supporting pole to hit an upper beam, and the damper has to be added to slowly release the elastic force of the coil spring, which will leads to relatively complicated structures, and high costs of components and assembly.

SUMMARY OF THE INVENTION

Therefore, the technical problem to be solved by the embodiments of the present invention is to provide a built-in roller shade actuation device, which is capable of smoothly driving the roller shade to be retracted or released.

To solve the above-mentioned technical problems, an embodiment of the present invention provides a built-in roller shade actuation device for actuating a winding drum with opposite ends rotatably mounted to corresponding frames and an outer side mounted with an end of a shade body. The built-in roller shade actuation device includes an actuator assembled in the winding drum for providing a rotation power, a shaft mounted to one of the frames outside an end of the winding drum and inserted into the winding drum, and a gear pair mounted between the actuator and the shaft for realizing power transmission. A shell of the actuator and the winding drum are relatively fixed in a circumferential direction. The gear pair includes a planetary gear mounted to an output shaft of the actuator, and a fixed gear mounted to the shaft and coaxial with the winding drum. The planetary gear revolves around the fixed gear while being driven to rotate by the output shaft of the actuator.

Furthermore, the actuator further includes a plane scroll spring, the plane scroll spring and the output shaft are axially parallel, an outer end of the plane scroll spring is fixed to a side surface of the output shaft, an end wall of the shell of the actuator defines a through hole, through which an end of the output shaft is exposed; the planetary gear and the output shaft are coaxially connected and are relatively fixed in the circumferential direction.

Furthermore, a gearbox is mounted to an outer surface of an end wall of the end of the actuator mounted with the output shaft, the planetary gear and the fixed gear are both assembled in the gearbox.

Furthermore, a first gear shaft extends from a middle of an end wall of the planetary gear, a second gear shaft extends from a middle of an end wall of the fixed gear, the first gear shaft of the planetary gear and the second gear shaft of the fixed gear are respectively extended through sidewalls of the gearbox and are respectively coaxially connected to the output shaft and the shaft, the first gear shaft and the output shaft are relatively fixed in a circumferential direction, and the second gear shaft and the shaft are relatively fixed in a circumferential direction.

Furthermore, the gear pair further comprises a transition gear rotatably mounted in the gearbox, the planetary gear and the fixed gear are respectively meshed with the transition gear.

Furthermore, two third gear shafts extend from middles of opposite end walls of the transition gear, the third gear shafts are respectively rotatably mounted in pivot holes defined in opposite sidewalls of the gearbox.

Furthermore, the number of the actuator is at least two, positions of the shell of the actuator facing opposite ends of the output shaft define two through holes, one of the ends of the output shaft defines a socket, and the other end of the output shaft forms a plug; cross sections of the socket and the plug are matched and non-circular, and cross sections of the first gear shaft and the socket are matched; the at least two actuators are sequentially connected in series to form an actuator combination through a plug-in fit of the socket and the plug, the first gear shaft of the planetary gear is engaged in the socket of the output shaft at an end of the actuator combination.

Furthermore, an inner wall of the winding drum protrudes toward a center of an inner cavity of the winding drum to form a protrusion, the shell of the actuator correspondingly defines a slot; when the actuator is assembled in the inner cavity of the winding drum, the protrusion is correspondingly engaged in the slot.

Furthermore, an end of the winding drum for the shaft inserting in is mounted with an end cover for covering the inner cavity of the winding drum, a positioning column extends from a middle of a sidewall of the end cover facing the inner cavity of the winding drum, a plurality of positioning tabs extends out from a sidewall of the positioning column, an embedded space is bounded by any two adjacent positioning tabs and the sidewall of the positioning column; when the end cover is assembled to the end of the winding drum, the protrusion of the winding drum is engaged in the embedded space, the end cover defines an insertion hole extending through a middle of an outer surface of the end cover and an end wall of the positioning column, the shaft extends through the insertion hole and is inserted in the inner cavity of the winding drum.

Furthermore, an end wall of the shaft connected to the fixed gear defines a shaft hole, cross sections of the shaft hole and the second gear shaft of the fixed gear are matched and non-circular; an outer sidewall of the frame defines an installation hole coaxial and communicating with the shaft hole, when the second gear shaft of the fixed gear is inserted in the shaft hole, a screw extends through the installation hole and is screwed in an insertion end of the second gear shaft.

By adopting the above-mentioned technical solutions, the beneficial effects of the inventive embodiment of the present invention are as follows. In the embodiments of the present invention, the power transmission is performed by providing the gear pair between the actuator and the shaft. When the actuator outputs the power to drive the planetary gear to rotate, the planetary gear revolves around the fixed gear while the gear is rotated, to drive the actuator and the winding drum fixed relative to the actuator in the circumferential direction to rotate synchronously, thereby realizing the retracting or releasing of the shade body on the winding drum. The whole actuation device has a simple structure, is driven by the gear pair, and has high transmission efficiency and stable transmission. All components of the actuation device are built in the inner cavity of the winding drum, and the gear pair can be used so that the output shaft does not have to be coaxial with a central axis of the winding drum, which is more conducive to design and structural optimization of the actuator.

Moreover, the present invention also provides a driving force by using a plane scroll spring, so that the driving force required for the shade body to be retracted or released can be better designed. Furthermore, the overall structure is simple, easy to assemble and easy to handle.

DETAILED DESCRIPTION OF THE INVENTION

The present application will be further described in detail below with reference to the accompanying drawings and specific embodiments. It should be understood that the following illustrative embodiments and illustrations are only used to explain the present invention and are not intended to limit the invention, and that the embodiments of the present invention and the features of the embodiments can be combined with each other without conflict.

Figure 1:
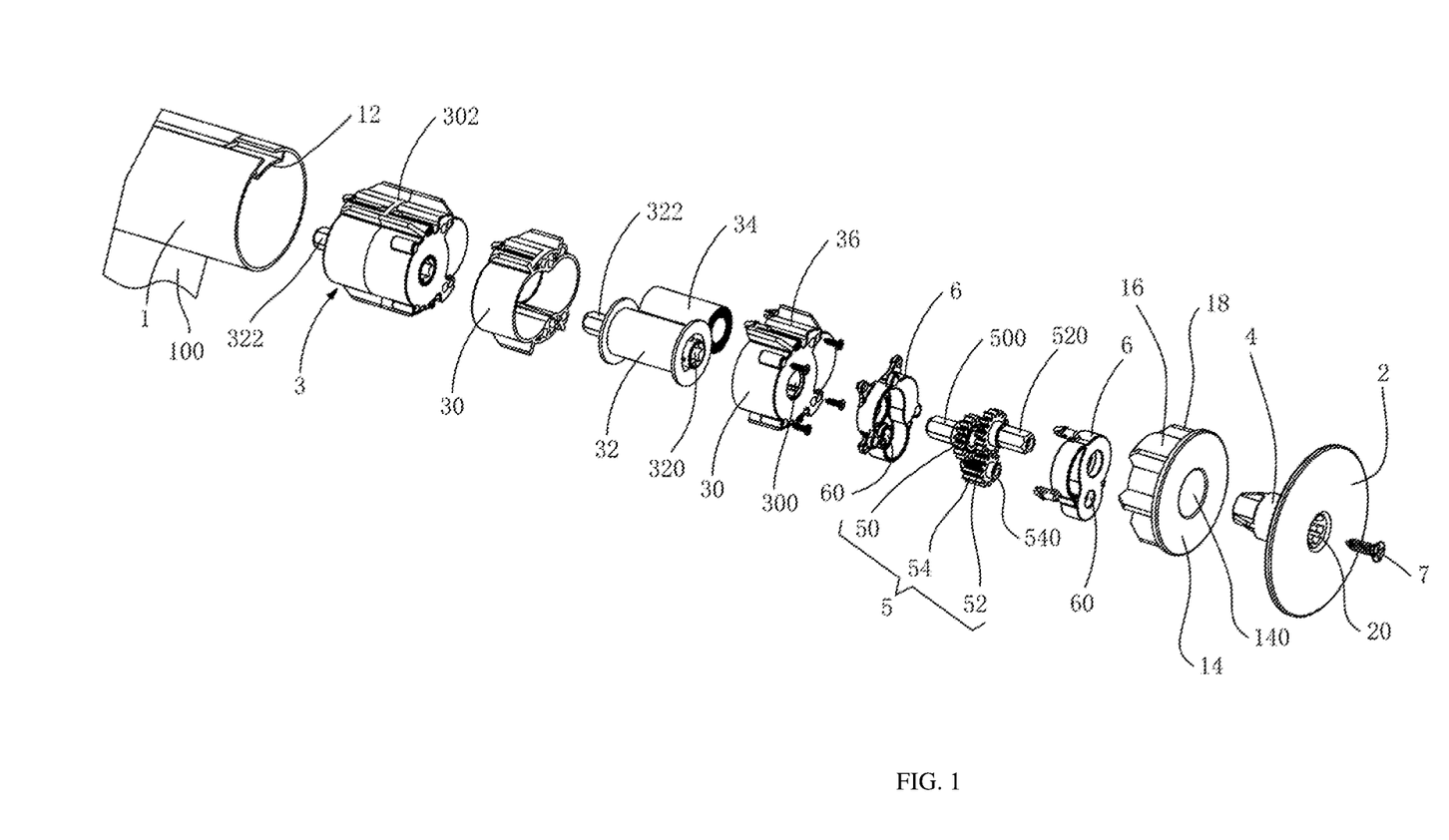
FIG. 1 is a partially exploded, isometric view of an embodiment of a built-in roller shade actuation device.
Figure 2:
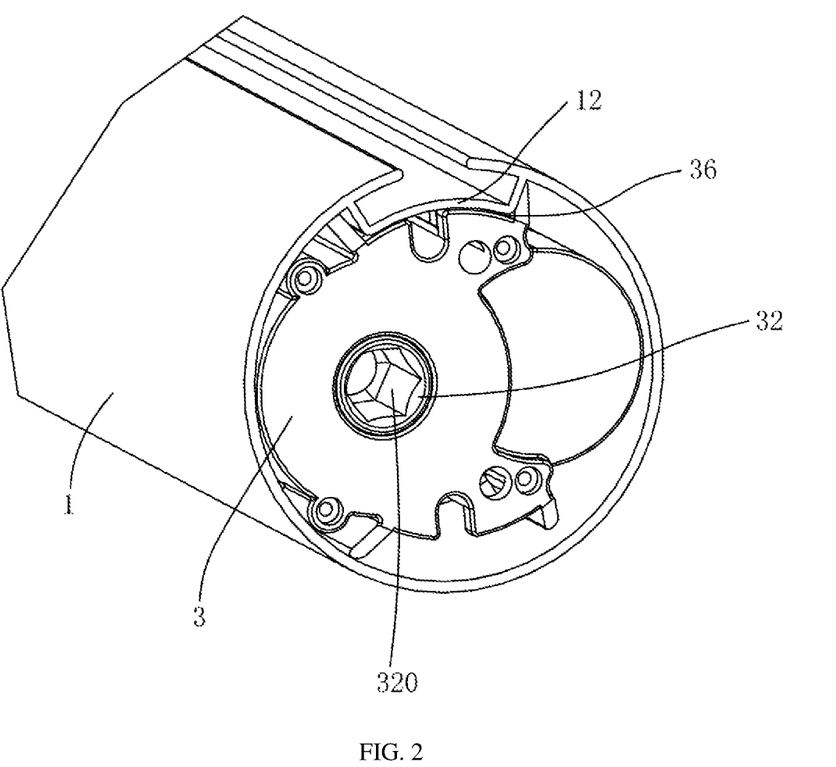
FIG. 2 is an assembled, isometric view of an embodiment of an actuator assembled in a winding drum of the built-in roller shade actuation device.
Figure 3:
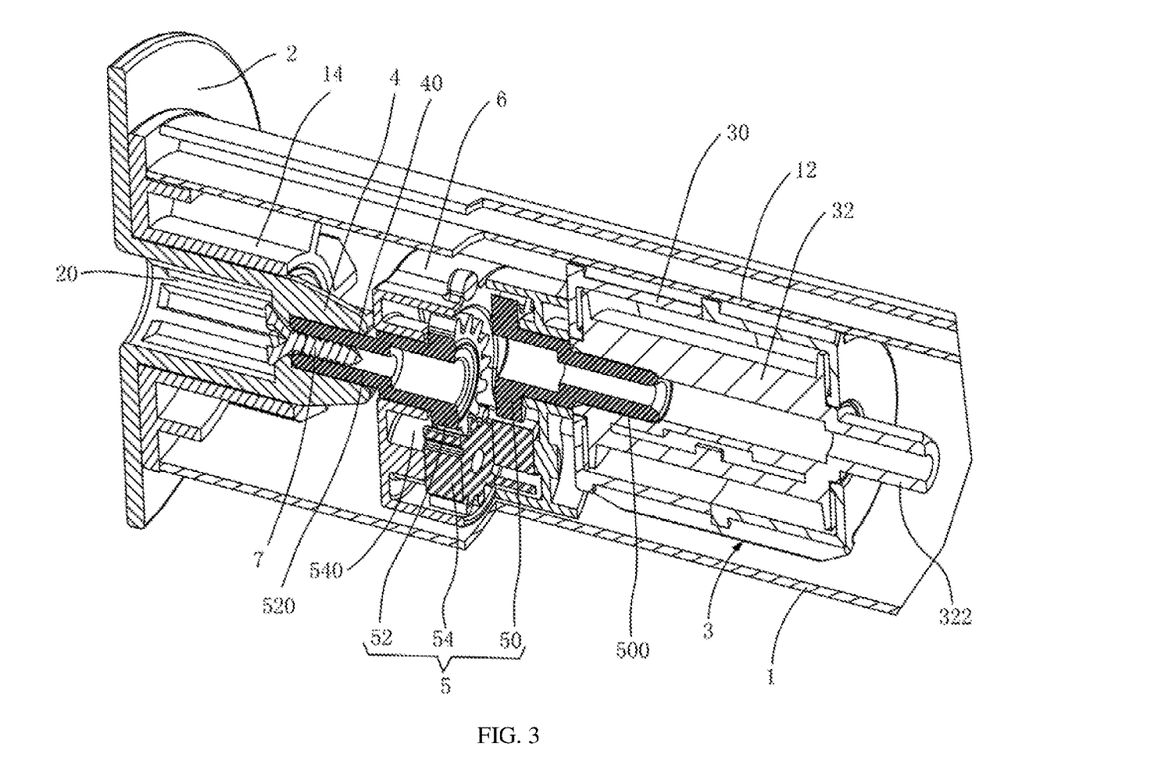
FIG. 3 is a cross-sectional view of an embodiment of the built-in roller shade actuation device.

Referring to FIGS. 1-3, an embodiment of the present disclosure provides a built-in roller shade actuation device for actuating a winding drum 1 with opposite ends rotatably mounted to corresponding frames 2 and an outer side mounted with an end of a shade body 100. The built-in roller shade actuation device includes an actuator 3 assembled in the winding drum 1 for providing a rotation power, a shaft 4 mounted to one of the frames 2 outside an end of the winding drum 1 and inserted into the winding drum 1, and a gear pair 5 mounted between the actuator 3 and the shaft 4 for realizing power transmission.

A shell 30 of the actuator 3 and the winding drum 1 are relatively fixed in a circumferential direction. The gear pair 5 includes a planetary gear 50 mounted to an output shaft 32 of the actuator 3, and a fixed gear 52 mounted to the shaft 4 and coaxial with the winding drum 1. The fixed gear 52 is fixed. The planetary gear 50 revolves around the fixed gear 52 while being driven to rotate by the output shaft 32 of the actuator 3.

The embodiment transmits power by the gear pair 5 between the actuator 3 and the shaft 4. When the actuator 3 outputs power to drive the planetary gear 50 to rotate, the planetary gear 50 rotates and simultaneously revolves around the fixed gear 52, so as to drive the actuator and the winding drum 1 relatively fixed in the circumferential direction with the actuator to rotate synchronously, thereby realizing the retracting or releasing of the shade body on the winding drum 1. The whole actuation device has a simple structure and is driven by the gear pair, which has high transmission efficiency and stable transmission. Moreover, all components of the actuation device are built into an inner cavity of the winding drum 1, and the gear pair 5 can be used so that the output shaft 32 does not have to be coaxial with a central axis of the winding drum 1, which is more conducive to the design and structural optimization of the actuator 3.

Referring to FIGS. 1 and 3, in an embodiment of the present disclosure, the actuator 3 further includes a plane scroll spring 34. The plane scroll spring 34 and the output shaft 32 are axially parallel. An outer end of the plane scroll spring 34 is fixed to a side surface of the output shaft 32. An end wall of the shell 30 of the actuator 3 defines a through hole 300 through which an end of the output shaft 32 is exposed. The planetary gear 50 and the output shaft 32 are coaxially connected and are relatively fixed in the circumferential direction.

The embodiment adopts the plane scroll spring 34 arranged in parallel with the output shaft 32 in the axial direction. The plane scroll spring 34 functions as a power member to drive the output shaft 32 to rotate, and the driving force provided is controllable, so that the driving force required for the shade body to be retracted or released can be better designed, and the overall structure is simple, convenient to assemble and easy to handle.

In another embodiment of the present disclosure, a gearbox 6 is mounted to an outer surface of an end wall of the end of the actuator 3 mounted with the output shaft 32. The planetary gear 50 and the fixed gear 52 are both mounted in the gearbox. The embodiment provides the gearbox 6 to accommodate the planetary gear 50 and the fixed gear 52. Therefore, the foreign matter can be prevented from being caught in the meshing portion of the gear transmission, thereby effectively ensuring the smoothness of the transmission.

In another embodiment of the present disclosure, a first gear shaft 500 extends from a middle of an end wall of the planetary gear 50. A second gear shaft 520 extends from a middle of an end wall of the fixed gear 52. The first gear shaft 500 of the planetary gear 50 and the second gear shaft 520 of the fixed gear 52 are respectively extended through sidewalls of the gearbox 6 and are respectively coaxially connected to the output shaft 32 and the shaft 4. The first gear shaft 500 and the output shaft 32 are relatively fixed in the circumferential direction. The second gear shaft 520 and the shaft 4 are relatively fixed in the circumferential direction. The present invention forms the first gear shaft 500 on the end wall of the planetary gear 50 and forms the second gear shaft 520 on the end surface of the fixed gear 52, and can respectively connect the planetary gear 50 to the output shaft 32 and connect the fixed gear 52 to the shaft 4, respectively through the first gear shaft 500 and the second gear shaft 520, which allows the planetary gear 50 and the output shaft 32 to be relatively fixed in the circumferential direction, and allows the fixed gear 50 and the shaft 4 to be relatively fixed in the circumferential direction, and makes it easy to manufacture and assemble.

Referring to FIGS. 1 and 3, in a further embodiment of the present invention, the gear pair further includes a transition gear 54 rotatably mounted in the gearbox 6. The planetary gear 50 and the fixed gear 52 are respectively meshed with the transition gear 54. By providing the transition gear 54, a transitional connection between the planetary gear 50 and the fixed gear 52 can be realized, to more flexibly design an axial position of the output shaft 32 of the actuator 3 as needed, and an axial distance between the planetary gear 50 and the fixed gear 52 can be smaller, especially suitable for a small internal space of the winding drum 1.

In a further embodiment of the present invention, two third gear shafts 540 extend from middles of opposite end walls of the transition gear 54. The third gear shafts 540 are respectively rotatably mounted in pivot holes 60 defined in opposite sidewalls of the gearbox 6. By forming the third gear shafts 540 on the end walls of the transition gear 54, it is convenient to assemble the transition gear 54 and accurately position a rotation axis of the transition gear 54.

Figure 4:
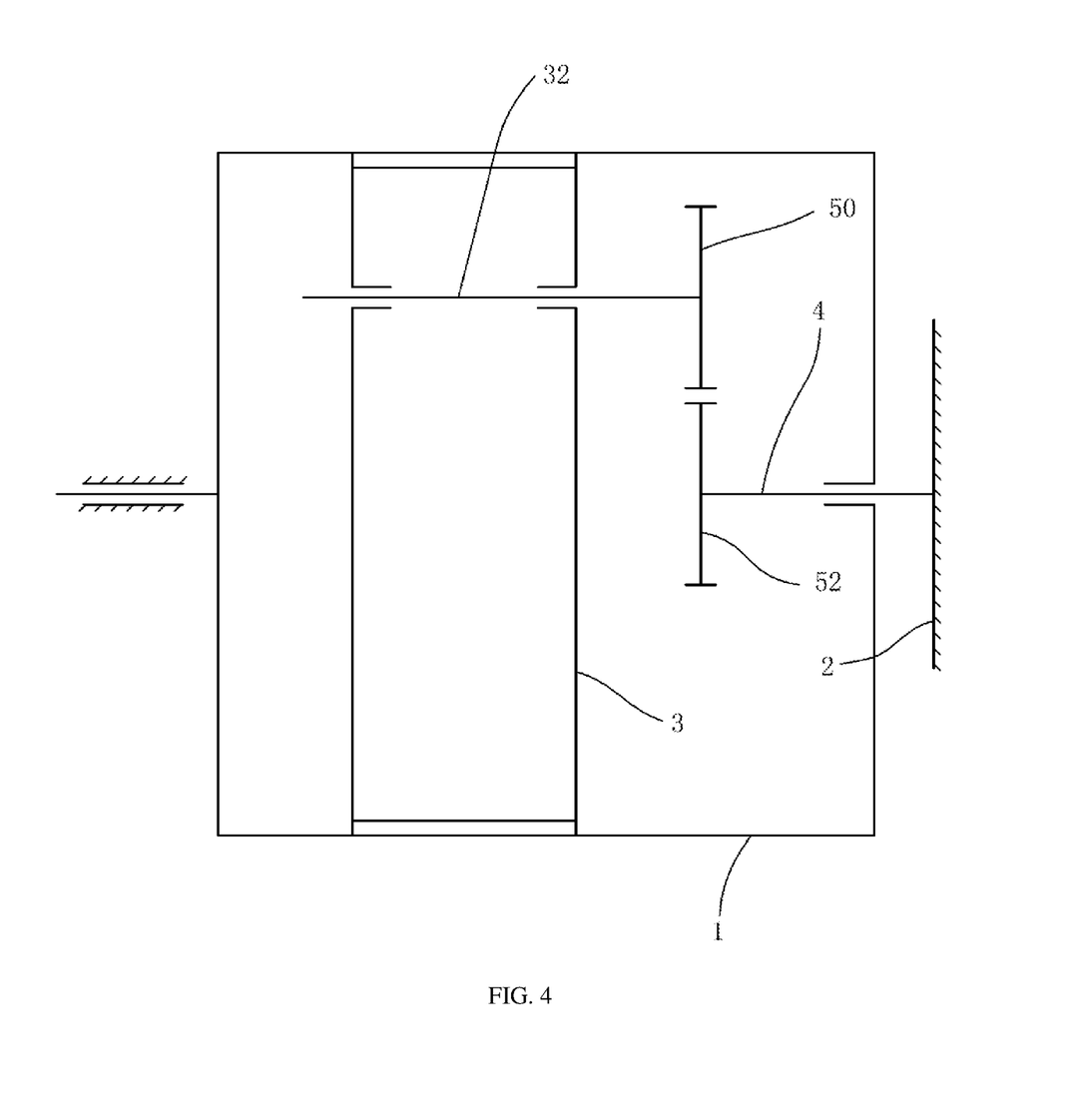
FIG. 4 is a structural principle diagram of an embodiment of a gear pair of the built-in roller shade actuation device.

In a relatively simplified embodiment shown in FIG. 4, the transition gear 54 is not set. The planetary gear 50 is directly meshed with the fixed gear 52, which still can achieve good transmission efficiency. Moreover, the structure is more compact and easy to maintain. In contrast, when the technical solution of the embodiment is adopted, especially when the internal space of the winding drum 1 is small, the strength of the planetary gear 50 and the fixed gear 52 needs to be higher.

Referring to FIG. 1, in an alternative embodiment of the present invention, the number of the actuator 3 is at least two. Positions of the shell 30 of the actuator 3 facing opposite ends of the output shaft 32 define two through holes 300. One of the ends of the output shaft 32 defines a socket 320, the other end of the output shaft 32 forms a plug 322. Cross sections of the socket 320 and the plug 322 are matched and are non-circular, such as hexagonal, pentagonal, triangular, elliptical, or star-shaped. Therefore, good matching transmission of power can be achieved. The cross sections of the first gear shaft 500 and the socket 320 are matched. The at least two actuators 3 are sequentially connected in series to form an actuator combination through a plug-in fit of the socket 320 and the plug 322. The first gear shaft 500 of the planetary gear 50 is engaged in the socket 300 of the output shaft 32 at an end of the actuator combination. In the embodiment, by connecting the at least two actuators 3 in series to form one actuator combination, the output shafts of the at least two actuators are connected to form an overall member to externally output power. Moreover, a non-circular cross-section design is adopted, and thus, the matching transmission of power is also well achieved between the output shafts 32 and the planetary gears 50.

In a further embodiment of the present invention, an inner wall of the winding drum 1 protrudes toward a center of the inner cavity to form a protrusion 12. The shell of the actuator 3 correspondingly defines a slot 36. When the actuator 3 is assembled in the inner cavity of the winding drum 1, the protrusion 12 is correspondingly engaged in the slot 36. Therefore, the relative fixing of the actuator 3 and the winding drum 1 in the circumferential direction can be realized, and the structure is simple and easy to assemble.

In a further embodiment of the present invention, an end of the winding drum 1 for the shaft 4 inserting in is mounted with an end cover 14 for covering the inner cavity of the winding drum 1. A positioning column 16 extends from a middle of a sidewall of the end cover 14 facing the inner cavity of the winding drum 1. A plurality of positioning tabs 18 extends out from a sidewall of the positioning column 16. An embedded space is bounded by any two adjacent positioning tabs 18 and the sidewall of the positioning column 16. When the end cover 14 is assembled to the end of the winding drum 1, the protrusion 12 of the winding drum 1 is correspondingly engaged in the embedded space. The end cover 14 defines an insertion hole 140 extending through a middle of an outer surface of the end cover 14 and an end of the positioning column 16. The shaft 4 extends through the insertion hole 140 and is inserted in the inner cavity of the winding drum 1. By designing the end cover 14, the components of the actuation device can be well packaged in the winding drum 1, to prevent external foreign matter from interfering with the normal operation of the actuation device.

In a further embodiment of the present invention, an end wall of the shaft 4 connected to the fixed gear 52 defines a shaft hole 40. Cross sections of the shaft hole 40 and the second gear shaft 520 of the fixed gear 52 are matched and non-circular, such as hexagonal, pentagonal, triangular, elliptical, or star-shaped, which can achieve good matching transmission of power. An outer sidewall of the frame 2 defines an installation hole 20 coaxial and communicating with the shaft hole 40. When the second gear shaft 520 of the fixed gear 52 is inserted in the shaft hole 40, a screw 7 extends through the installation hole 20 and is screwed in an insertion end of the second gear shaft 520. By designing the shaft hole 40 for the second gear shaft 520 of the fixed gear 52 inserting in and then being fixed by means of the screw 7, the fixed gear 52 can be more firmly assembled on the shaft 4.

The specific embodiments described above further explain the objectives, technical solutions, and beneficial effects of the present invention. It is to be understood that the foregoing description is only specific embodiments of the present invention, and is not intended to limit the scope of the present invention. Any modifications, equivalent substitutions, improvements made within the spirit and scope of the present invention are intended to be included in the scope of the present invention.

What is claimed is:

1. A built-in roller shade actuation device for actuating a winding drum with opposite ends rotatably mounted to corresponding frames and an outer side mounted with an end of a shade body, comprising:
   an actuator assembled in the winding drum for providing a rotation power, wherein a shell of the actuator and the winding drum are relatively fixed in a circumferential direction;
   a shaft mounted to one of the frames outside an end of the winding drum and inserted into the winding drum; and
   a gear pair mounted between the actuator and the shaft for realizing power transmission, and comprising a planetary gear mounted to an output shaft of the actuator, and a fixed gear mounted to the shaft and coaxial with the winding drum, wherein the planetary gear revolves around the fixed gear while being driven to rotate by the output shaft of the actuator.

2. The built-in roller shade actuation device of claim 1, wherein the actuator further comprises a plane scroll spring, the plane scroll spring and the output shaft are axially parallel, an outer end of the plane scroll spring is fixed to a side surface of the output shaft, an end wall of the shell of the actuator defines a through hole, through which an end of the output shaft is exposed; the planetary gear and the output shaft are coaxially connected and are relatively fixed in the circumferential direction.

3. The built-in roller shade actuation device of claim 1, wherein a gearbox is mounted to an outer surface of an end wall of the end of the actuator mounted with the output shaft, the planetary gear and the fixed gear are both assembled in the gearbox.

4. The built-in roller shade actuation device of claim 3, wherein a first gear shaft extends from a middle of an end wall of the planetary gear, a second gear shaft extends from a middle of an end wall of the fixed gear, the first gear shaft of the planetary gear and the second gear shaft of the fixed gear are respectively extended through sidewalls of the gearbox and are respectively coaxially connected to the output shaft and the shaft, the first gear shaft and the output shaft are relatively fixed in a circumferential direction, and the second gear shaft and the shaft are relatively fixed in a circumferential direction.

5. The built-in roller shade actuation device of claim 3, wherein the gear pair further comprises a transition gear rotatably mounted in the gearbox, the planetary gear and the fixed gear are respectively meshed with the transition gear.

6. The built-in roller shade actuation device of claim 5, wherein two third gear shafts extend from middles of opposite end walls of the transition gear, the third gear shafts are respectively rotatably mounted in pivot holes defined in opposite sidewalls of the gearbox.

7. The built-in roller shade actuation device of claim 2, wherein the number of the actuator is at least two, positions of the shell of the actuator facing opposite ends of the output shaft define two through holes, one of the ends of the output shaft defines a socket, and the other end of the output shaft forms a plug; cross sections of the socket and the plug are matched and non-circular, and cross sections of the first gear shaft and the socket are matched; the at least two actuators are sequentially connected in series to form an actuator combination through a plug-in fit of the socket and the plug, the first gear shaft of the planetary gear is engaged in the socket of the output shaft at an end of the actuator combination.

8. The built-in roller shade actuation device of claim 1, wherein an inner wall of the winding drum protrudes toward a center of an inner cavity of the winding drum to form a protrusion, the shell of the actuator correspondingly defines a slot; wherein when the actuator is assembled in the inner cavity of the winding drum, the protrusion is correspondingly engaged in the slot.

9. The built-in roller shade actuation device of claim 8, wherein an end of the winding drum for the shaft inserting in is mounted with an end cover for covering the inner cavity of the winding drum, a positioning column extends from a middle of a sidewall of the end cover facing the inner cavity of the winding drum, a plurality of positioning tabs extends out from a sidewall of the positioning column, an embedded space is bounded by any two adjacent positioning tabs and the sidewall of the positioning column; wherein when the end cover is assembled to the end of the winding drum, the protrusion of the winding drum is engaged in the embedded space, the end cover defines an insertion hole extending through a middle of an outer surface of the end cover and an end wall of the positioning column, the shaft extends through the insertion hole and is inserted in the inner cavity of the winding drum.

10. The built-in roller shade actuation device of claim 1, wherein an end wall of the shaft connected to the fixed gear defines a shaft hole, cross sections of the shaft hole and the second gear shaft of the fixed gear are matched and non-circular; an outer sidewall of the frame defines an installation hole coaxial and communicating with the shaft hole, when the second gear shaft of the fixed gear is inserted in the shaft hole, a screw extends through the installation hole and is screwed in an insertion end of the second gear shaft.

11. The built-in roller shade actuation device of claim 2, wherein a gearbox is mounted to an outer surface of an end wall of the end of the actuator mounted with the output shaft, the planetary gear and the fixed gear are both assembled in the gearbox.

12. The built-in roller shade actuation device of claim 11, wherein a first gear shaft extends from a middle of an end wall of the planetary gear, a second gear shaft extends from a middle of an end wall of the fixed gear, the first gear shaft of the planetary gear and the second gear shaft of the fixed gear are respectively extended through sidewalls of the gearbox and are respectively coaxially connected to the output shaft and the shaft, the first gear shaft and the output shaft are relatively fixed in a circumferential direction, and the second gear shaft and the shaft are relatively fixed in a circumferential direction.

13. The built-in roller shade actuation device of claim 11, wherein the gear pair further comprises a transition gear rotatably mounted in the gearbox, the planetary gear and the fixed gear are respectively meshed with the transition gear.

14. The built-in roller shade actuation device of claim 13, wherein two third gear shafts extend from middles of opposite end walls of the transition gear, the third gear shafts are respectively rotatably mounted in pivot holes defined in opposite sidewalls of the gearbox.

15. The built-in roller shade actuation device of claim 2, wherein an inner wall of the winding drum protrudes toward a center of an inner cavity of the winding drum to form a protrusion, the shell of the actuator correspondingly defines a slot; wherein when the actuator is assembled in the inner cavity of the winding drum, the protrusion is correspondingly engaged in the slot.

16. The built-in roller shade actuation device of claim 15, wherein an end of the winding drum for the shaft inserting in is mounted with an end cover for covering the inner cavity of the winding drum, a positioning column extends from a middle of a sidewall of the end cover facing the inner cavity of the winding drum, a plurality of positioning tabs extends out from a sidewall of the positioning column, an embedded space is bounded by any two adjacent positioning tabs and the sidewall of the positioning column; wherein when the end cover is assembled to the end of the winding drum, the protrusion of the winding drum is engaged in the embedded space, the end cover defines an insertion hole extending through a middle of an outer surface of the end cover and an end wall of the positioning column, the shaft extends through the insertion hole and is inserted in the inner cavity of the winding drum.

17. The built-in roller shade actuation device of claim 2, wherein an end wall of the shaft connected to the fixed gear defines a shaft hole, cross sections of the shaft hole and the second gear shaft of the fixed gear are matched and non-circular; an outer sidewall of the frame defines an installation hole coaxial and communicating with the shaft hole, when the second gear shaft of the fixed gear is inserted in the shaft hole, a screw extends through the installation hole and is screwed in an insertion end of the second gear shaft.

* * * * *